(12) United States Patent
Taniguchi et al.

(10) Patent No.: US 10,173,540 B2
(45) Date of Patent: Jan. 8, 2019

(54) CONTACTLESS POWER TRANSMISSION DEVICE

(71) Applicant: TOYOTA JIDOSHA KABUSHIKI KAISHA, Toyota-shi, Aichi-ken (JP)

(72) Inventors: Satoshi Taniguchi, Toyota (JP); Shinji Ichikawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 90 days.

(21) Appl. No.: 15/036,289

(22) PCT Filed: Nov. 25, 2014

(86) PCT No.: PCT/JP2014/081020
§ 371 (c)(1),
(2) Date: May 12, 2016

(87) PCT Pub. No.: WO2015/087693
PCT Pub. Date: Jun. 18, 2015

(65) Prior Publication Data
US 2016/0272071 A1    Sep. 22, 2016

(30) Foreign Application Priority Data
Dec. 11, 2013  (JP) .................................. 2013-256026

(51) Int. Cl.
*H02J 50/60* (2016.01)
*H02J 50/80* (2016.01)
(Continued)

(52) U.S. Cl.
CPC ......... *B60L 11/182* (2013.01); *B60L 11/1831* (2013.01); *B60L 11/1833* (2013.01);
(Continued)

(58) Field of Classification Search
CPC ............... B60L 11/182; B60L 11/1831; B60L 11/1846; B60L 11/1833; B60L 11/1829;
(Continued)

(56) References Cited

U.S. PATENT DOCUMENTS 7,741,734 B2     6/2010  Joannopoulos et al.
2007/0222542 A1  9/2007  Joannopoulos et al.
(Continued)

FOREIGN PATENT DOCUMENTS

AU   2006269374 B2   1/2007
AU   2007349874 A2   10/2008
(Continued)

*Primary Examiner* — Jared Fureman
*Assistant Examiner* — Emmanuel R Dominique
(74) *Attorney, Agent, or Firm* — Oliff PLC

(57) ABSTRACT

A contactless power transmission device includes: a plurality of power transmission coil units; a plurality of detection units configured to detect a foreign substance on and around each power transmission coil unit; a communication unit configured to communicate with a vehicle; and a control unit configured to select one of the plurality of power transmission coil units based on information about a mounting position of a power reception device from the vehicle obtained by the communication unit, and to guide, when a detection unit detects a foreign substance at the selected power transmission coil unit, the vehicle toward a power transmission coil unit different from the selected power transmission coil unit, before the vehicle stops. This can prevent a reduction in power transfer efficiency due to a foreign substance or the like in a power transmission device including a plurality of power transmission coils.

4 Claims, 3 Drawing Sheets

(51) Int. Cl.
*B60L 11/18* (2006.01)
*H02J 50/40* (2016.01)
*H02J 7/00* (2006.01)
*H02J 50/90* (2016.01)
*H02J 50/12* (2016.01)
*H02J 7/02* (2016.01)
*B60M 7/00* (2006.01)

(52) U.S. Cl.
CPC ......... *B60L 11/1846* (2013.01); *H02J 7/0027* (2013.01); *H02J 7/025* (2013.01); *H02J 50/12* (2016.02); *H02J 50/40* (2016.02); *H02J 50/60* (2016.02); *H02J 50/80* (2016.02); *H02J 50/90* (2016.02); *B60M 7/003* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC .. H02J 50/80; H02J 50/90; H02J 7/025; H02J 50/60; H02J 50/12; H02J 7/0027; Y02T 10/7072; Y02T 90/121; Y02T 90/125; Y02T 90/163; Y02T 90/169; Y02T 90/16; Y04S 30/14
See application file for complete search history.

(56) References Cited

U.S. PATENT DOCUMENTS

| | | |
|---|---|---|
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0117596 A1* | 5/2010 | Cook .................... B60L 11/182 320/108 |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0161217 A1 | 6/2010 | Yamamoto |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0285349 A1* | 11/2011 | Widmer ................ B60L 11/182 320/108 |
| 2012/0161530 A1* | 6/2012 | Urano .................... H02J 7/025 307/104 |
| 2013/0029595 A1* | 1/2013 | Widmer ................ H04B 5/0031 455/39 |
| 2013/0127409 A1 | 5/2013 | Ichikawa |
| 2013/0154384 A1 | 6/2013 | Nakamura |
| 2013/0193749 A1 | 8/2013 | Nakamura et al. |
| 2014/0092236 A1* | 4/2014 | Findeisen .......... G06K 9/00791 348/118 |
| 2014/0174870 A1* | 6/2014 | Niizuma ................ H02J 5/005 191/10 |
| 2015/0008877 A1 | 1/2015 | Ichikawa et al. |
| 2015/0251552 A1* | 9/2015 | Noack .................... H02J 50/80 191/10 |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A | 12/2009 |
| EP | 2199142 A1 | 6/2010 |
| IN | 735/DELNP/2008 | 5/2008 |
| IN | 6195/DELNP/2009 | 7/2010 |
| JP | 2009-501510 A | 1/2009 |
| JP | 2010-172185 A | 8/2010 |
| JP | 2013-009591 A | 1/2013 |
| JP | 2013-110822 A | 6/2013 |
| JP | 2013-126326 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |

\* cited by examiner

CONTACTLESS POWER TRANSMISSION DEVICE

TECHNICAL FIELD

The present invention relates to a contactless power transmission device.

BACKGROUND ART

In recent years, various contactless charging systems have been proposed, and some of them have been proposed to be used to charge a vehicle.

A vehicle may be charged, for example, by contactlessly transferring electric power from a power transmission coil of a power transmission device to a power reception device (for example, a power reception coil) of the vehicle (for example, Japanese Patent Laying-Open No. 2013-126326).

CITATION LIST

Patent Document

PTD 1: Japanese Patent Laying-Open No. 2013-126326
PTD 2: Japanese Patent Laying-Open No. 2013-009591
PTD 3: Japanese Patent Laying-Open No. 2013-154815
PTD 4: Japanese Patent Laying-Open No. 2013-146154
PTD 5: Japanese Patent Laying-Open No. 2013-146148
PTD 6: Japanese Patent Laying-Open No. 2013-110822
PTD 7: Japanese Patent Laying-Open No. 2013-126327

SUMMARY OF INVENTION

Technical Problem

The position at which a power reception coil is mounted in a vehicle often varies depending on the vehicle. Japanese Patent Laying-Open No. 2013-126326 proposes that a power transmission device is configured to include a plurality of power transmission coils, an appropriate power transmission coil is selected from the plurality of power transmission coils in accordance with a vehicle having a power reception coil mounted therein, and power transfer is performed using the selected power transmission coil.

However, if a foreign substance (for example, a metal piece) is present on the selected power transmission coil or the like, there may occur such a problem that power transfer efficiency is reduced or power transfer cannot be performed.

An object of the present invention is to prevent a reduction in power transfer efficiency due to a foreign substance or the like in a power transmission device (contactless power transmission device) including a plurality of power transmission coils.

Solution to Problem

In summary, the present invention is directed to a contactless power transmission device, including: a plurality of power transmission coil units; a detection unit configured to detect a foreign substance on and around each power transmission coil unit; a communication unit configured to communicate with a vehicle; and a control unit configured to select one of the plurality of power transmission coil units based on information about a mounting position of a power reception device from the vehicle obtained by the communication unit, and to guide, when the detection unit detects a foreign substance at the selected power transmission coil unit, the vehicle toward a power transmission coil unit different from the selected power transmission coil unit, before the vehicle stops.

In the contactless power transmission device having the above configuration, one of the plurality of power transmission coil units (a power transmission coil unit includes a power transmission coil) is selected based on the information about the mounting position of the power reception device in the vehicle. Here, when the detection unit detects a foreign substance at the selected power transmission coil unit, the vehicle is guided toward a power transmission coil unit different from the selected power transmission coil unit. Therefore, even when a foreign substance is detected at a power transmission coil unit, contactless power transfer can be performed using a different power transmission coil unit.

Advantageous Effects of Invention

According to the present invention, it is possible to prevent a reduction in power transfer efficiency due to a foreign substance or the like in a power transmission device including a plurality of power transmission coil units.

DESCRIPTION OF EMBODIMENTS

Figure 1:
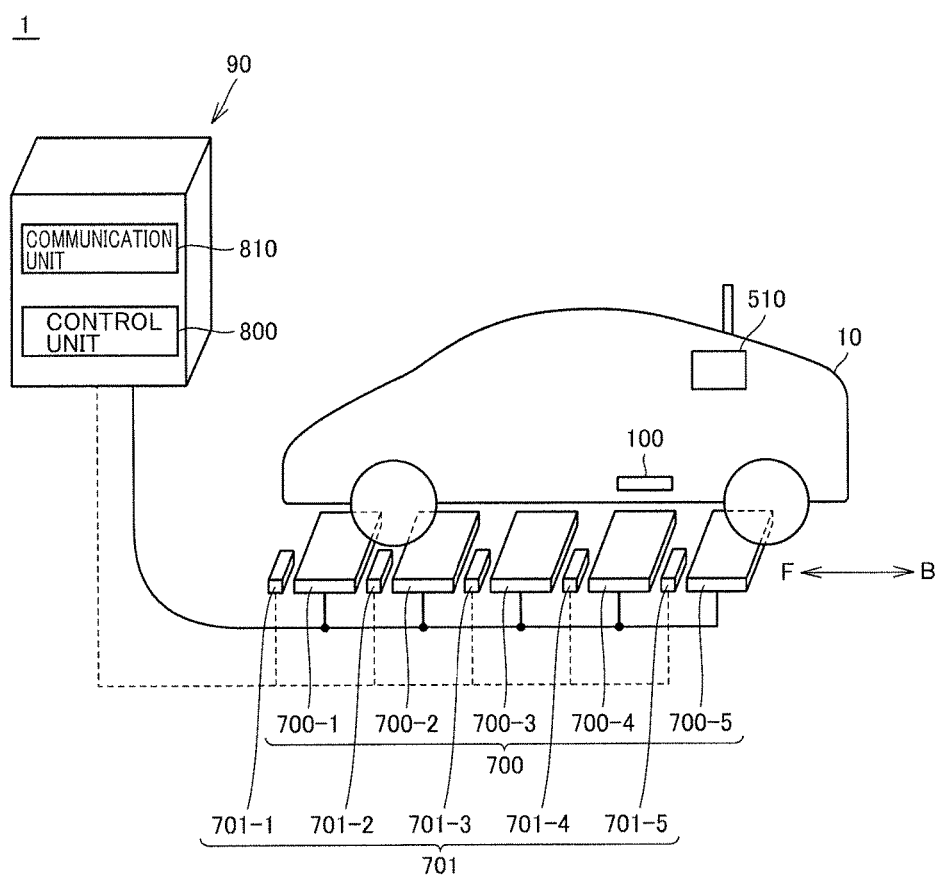
FIG. 1 is a view for illustrating a contactless power transfer system to which a contactless power transmission device in accordance with an embodiment is applied.

Hereinafter, an embodiment of the present invention will be described in detail with reference to the drawings. It should be noted that identical or corresponding parts in the drawings will be designated by the same reference numerals, and the description thereof will not be repeated.

FIG. 1 is a view for illustrating a contactless power transfer system to which a contactless power transmission device (hereinafter may also be simply referred to as a "power transmission device") in accordance with an embodiment is applied. In a contactless power transfer system 1, a power transmission device 90 is used to charge a vehicle 10.

For convenience of the description, in FIG. 1, the front-back direction of the vehicle is indicated by arrows. "F" indicates a direction F in which the vehicle moves forward, and "B" indicates a direction B in which the vehicle moves backward. Referring to FIG. 1, vehicle 10 includes a power reception coil unit 100 and a communication unit 510. Vehicle 10 also includes other elements, which will be described later with reference to FIG. 2.

Power reception coil unit 100 constitutes a power reception device for contactlessly receiving electric power from power transmission device 90.

Communication unit 510 is used to communicate with power transmission device 90.

Referring to FIG. 1, power transmission device 90 includes a power transmission coil unit 700, a detection unit 701, a control unit 800 (which may also be referred to as a "power supply ECU 800" as described later with reference to FIG. 2), and a communication unit 810. Power transmission device 90 also includes other elements, which will be described later with reference to FIG. 2.

Power transmission coil unit 700 has a plurality of power transmission coil units. Although FIG. 1 exemplarily shows a total of five power transmission coil units 700-1 to 700-5, the number of power transmission coil units included in power transmission coil unit 700 is not limited thereto.

Detection unit 701 detects a foreign substance on and around each of power transmission coil units 700-1 to 700-5. Detection of a foreign substance may be performed, for example, by using an image taken by a camera (not shown) or using radar.

Detection unit 701 may be constituted by a plurality of detection units, and can have a configuration having detection units 701-1 to 701-5 as shown in FIG. 1, for example. Detection units 701-1 to 701-5 detect foreign substances which are present at power transmission coil units 700-1 to 700-5. For example, detection unit 701-1 detects a foreign substance which is present at power transmission coil unit 700-1, and detection unit 701-2 detects a foreign substance at power transmission coil unit 700-2. The same applies to detection units 701-3 to 701-5.

Power supply ECU 800 controls each element of power transmission device 90. Further, power supply ECU 800 can also control vehicle 10 by using communication unit 510.

Communication unit 810 is used to communicate with (communication unit 510 of) vehicle 10.

In contactless power transfer system 1, vehicle 10 is charged to improve power transfer efficiency and the like, with power transmission coil unit 700 of power transmission device 90 and power reception coil unit 100 of vehicle 10 being aligned to face each other. Specifically, power reception coil unit 100 is aligned with any of power transmission coil units 700-1 to 700-5. Then, vehicle 10 is charged using the power transmission coil unit with which power reception coil unit 100 is aligned.

Which of power transmission coil units 700-1 to 700-5 is to be used to charge vehicle 10 depends on vehicle 10. Specifically, the power transmission coil unit to be used to charge vehicle 10 is determined based on at which position in vehicle 10 power reception coil unit 100 is mounted, that is, information about the mounting position of power reception coil unit 100 in vehicle 10. Vehicle 10 transmits the information about the mounting position to power transmission device 90. Specifically, a power transmission coil unit which is suitable for charging vehicle 10 is selected from power transmission coil units 700-1 to 700-5, based on the information about the mounting position of power reception coil unit 100 from vehicle 10 obtained by communication unit 810. It should be noted that the information about the mounting position may include information about the type of a coil of power reception coil unit 100 described later, the position of the coil in power reception coil unit 100, the size of the coil, and the like.

Power reception coil unit 100 is arranged at a lower part of vehicle 10 such that it can face power transmission coil unit 700. For example, in a case where power reception coil unit 100 is mounted at a position closer to the rear side of vehicle 10 (the side in direction B shown in FIG. 1), a power transmission coil unit selected from power transmission coil units 700-5, 700-4, 700-3, and the like is suitably used to charge vehicle 10. Further, in a case where power reception coil unit 100 is mounted at a position closer to the front side of vehicle 10 (the side in direction F shown in FIG. 1), a power transmission coil unit selected from power transmission coil units 700-1, 700-2, 700-3, and the like is suitably used to charge vehicle 10.

However, even though a power transmission coil unit suitable for charging vehicle 10 is selected as described above, if a foreign substance is present at the power transmission coil unit, there occurs such a problem that charging of vehicle 10 using the power transmission coil cannot be started, or, even though the charging is started, charging efficiency is reduced.

Accordingly, in the embodiment, when a foreign substance is detected on or around the power transmission coil unit selected as a candidate to be used for power transmission, another power transmission coil unit different from the originally selected power transmission coil unit is selected, toward which vehicle 10 is guided. This guidance is performed before vehicle 10 moving for alignment stops. Then, vehicle 10 is charged using the power transmission coil unit different from the originally selected power transmission coil unit. If no foreign substance is present at the other power transmission coil unit, vehicle 10 is charged at a good power transfer efficiency.

According to the embodiment, it is possible to prevent a reduction in power transfer efficiency due to a foreign substance or the like in a power transmission device including a plurality of power transmission coils.

Figure 2:
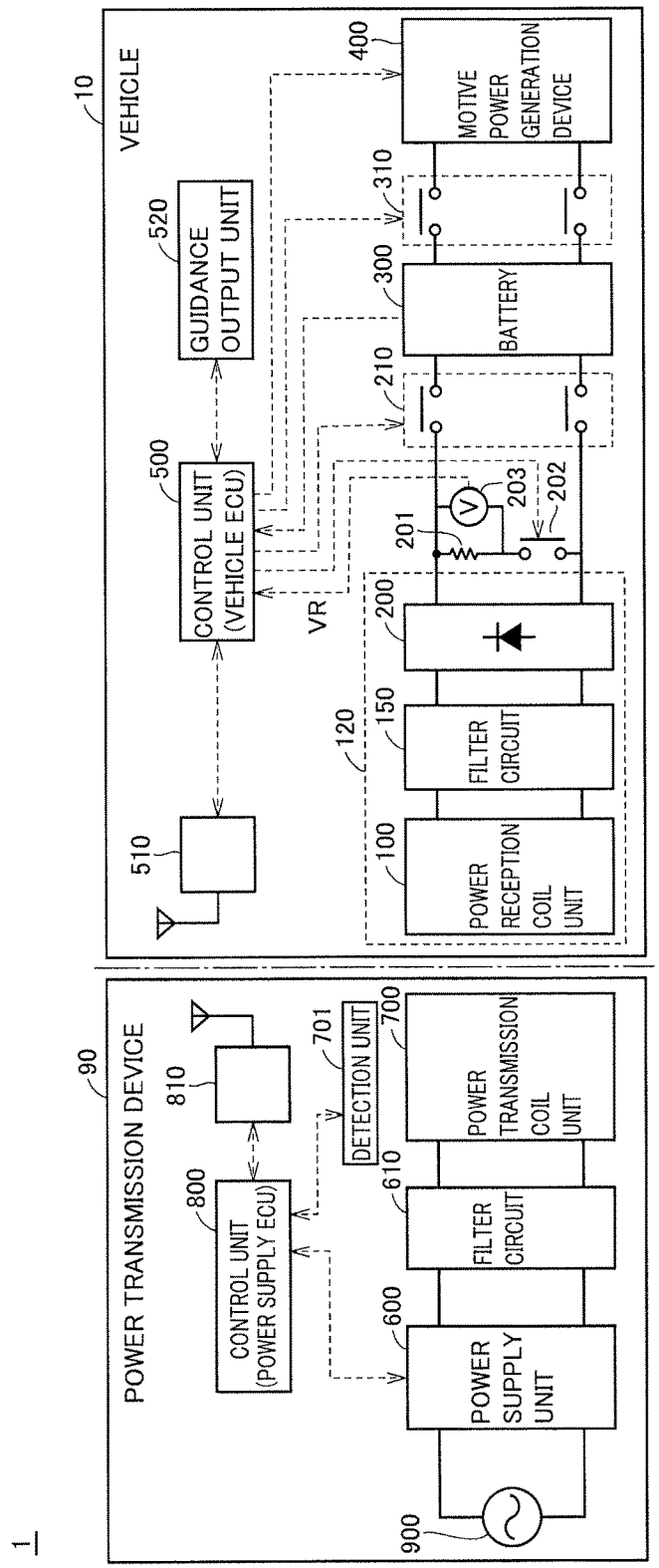
FIG. 2 is a view for illustrating a block configuration of the contactless power transfer system.

FIG. 2 is a view for illustrating a block configuration of contactless power transfer system 1 shown in FIG. 1.

Referring to FIG. 2, contactless power transfer system 1 is roughly divided into vehicle 10 and power transmission device 90. In contactless power transfer system 1, contactless power transfer from power transmission device 90 to vehicle 10 is performed. The contactless power transfer is performed via power transmission coil unit 700 included in power transmission device 90 and power reception coil unit 100 mounted in vehicle 10.

First, of contactless power transfer system 1, vehicle 10 will be described.

Vehicle 10 includes a vehicle ECU (Electronic Control Unit) 500 serving as a control unit. Vehicle ECU 500 includes a CPU (Central Processing Unit), a storage device, an input/output buffer, and the like (which are not shown), performs input of signals from various sensors and output of control signals to apparatuses, as well as performs control of apparatuses in vehicle 10. As an example, vehicle ECU 500 performs control of traveling of vehicle 10, and control of charging of a battery 300. It should be noted that these controls can be processed not only by software but also by dedicated hardware (electronic circuitry).

Vehicle 10 further includes a power reception device 120, a resistor 201, a relay 202, a voltage sensor 203, a relay 210, battery 300, a system main relay (SMR) 310, a motive power generation device 400, vehicle ECU 500, and a guidance output unit 520.

Power reception device 120 includes power reception coil unit 100, a filter circuit 150, and a rectifier 200. Power reception coil unit 100 includes a secondary coil for contactlessly receiving alternating current (AC) power output from power transmission coil unit 700. The power received by power reception coil unit 100 is output to filter circuit 150. Filter circuit 150 suppresses harmonic noise. Filter circuit 150 is constituted by an LC filter including an inductor and a capacitor, for example.

Power reception coil unit 100 also includes a capacitor, in addition to the secondary coil. The secondary coil and the capacitor constitute a resonance circuit. Preferably, a Q value indicating the intensity of resonance is more than or equal to 100.

The AC power having harmonic noise suppressed by filter circuit 150 is output to rectifier 200. Rectifier 200 rectifies the AC power. The power rectified by rectifier 200 is output as charging power for battery 300.

Relay 210 is provided between rectifier 200 and battery 300. Relay 210 is brought into a conductive state (ON) when battery 300 is charged with the electric power from power transmission device 90.

Relay 202 is provided between rectifier 200 and relay 210. Further, resistor 201 is connected in series with relay 202. Furthermore, voltage sensor 203 is provided to be able to detect a voltage (received voltage) VR across resistor 201.

Battery 300 is constituted by a secondary battery such as a lithium ion battery or a nickel-hydrogen battery, for example. Battery 300 has a voltage of about 200 V, for example. Battery 300 is also charged with electric power from motive power generation device 400 described later. Conversely, power is also discharged from battery 300 to motive power generation device 400. Although not shown in particular, a DC/DC converter for adjusting an output voltage of rectifier 200 may be provided between rectifier 200 and battery 300.

Motive power generation device 400 generates a traveling drive force for vehicle 10 using the electric power stored in battery 300. Although not shown in particular, motive power generation device 400 includes, for example, an inverter which receives the electric power from battery 300, a motor driven by the inverter, drive wheels driven by the motor, and the like. It should be noted that motive power generation device 400 may include a power generator for charging battery 300, and an engine which can drive the power generator.

Further, vehicle 10 includes guidance output unit 520, in addition to communication unit 510 previously described with reference to FIG. 1. Guidance output unit 520 is a user interface, and is used, for example, to guide (power reception coil unit 100 of) vehicle 10 to power transmission coil unit 700 described later. The driver of vehicle 10 can drive vehicle 10 with reference to images and video output by guidance output unit 520, and guide vehicle 10 to power transmission coil unit 700. Guidance output unit 520 may output sound and audio, instead of images and video. It should be noted that guidance of vehicle 10 to power transmission coil unit 700 may be automatically performed under the control of vehicle ECU 500 on vehicle 10.

Next, of contactless power transfer system 1, power transmission device 90 will be described.

Referring to FIG. 2, power transmission device 90 includes an external power source 900, communication unit 810, a power supply unit 600, a filter circuit 610, and power transmission coil unit 700.

Power transmission coil unit 700 constitutes the power transmission device. Power transmission coil unit 700 is provided, for example, on or in the ground of a parking space in which vehicle 10 is to be parked. Although not shown in FIG. 2, power transmission coil unit 700 has a plurality of power transmission coil units (for example, power transmission coil units 700-1 to 700-5 shown in FIG. 1).

When battery 300 is charged by power transmission device 90, vehicle ECU 500 communicates with communication unit 810 of power transmission device 90 using communication unit 510, to exchange information about start/stop of power reception, a power reception condition of vehicle 10, and the like with power supply ECU 800 described later.

Power supply unit 600 receives electric power from external power source 900 such as a commercial system power source, to generate AC power having a predetermined transfer frequency. The generated AC power is output to filter circuit 610.

Filter circuit 610 suppresses harmonic noise generated from power supply unit 600. Filter circuit 610 is constituted by an LC filter including an inductor and a capacitor, for example.

The AC power having harmonic noise suppressed by filter circuit 610 is output to power transmission coil unit 700. Power transmission coil unit 700 includes a primary coil for contactlessly transmitting electric power to power reception coil unit 100. Power transmission coil unit 700 contactlessly transmits the AC power having the transfer frequency to power reception coil unit 100 of vehicle 10, via an electromagnetic field generated around power transmission coil unit 700.

Power transmission coil unit 700 also includes a capacitor, in addition to the primary coil. The primary coil and the capacitor constitute a resonance circuit. Preferably, a Q value indicating the intensity of resonance is more than or equal to 100.

Power supply ECU 800 serving as a control unit includes a CPU, a storage device, an input/output buffer, and the like (which are not shown), performs input of signals from various sensors and output of control signals to apparatuses, as well as performs control of apparatuses in power transmission device 90. As an example, power supply ECU 800 performs control of switching of power supply unit 600 such that power supply unit 600 generates the AC power having the transfer frequency. It should be noted that these controls can be processed not only by software but also by dedicated hardware (electronic circuitry).

It should be noted that, when electric power is transmitted to vehicle 10, power supply ECU 800 communicates with communication unit 510 of vehicle 10 using communication unit 810, to exchange information about start/stop of charging, the power reception condition of vehicle 10, and the like with vehicle 10.

It should be noted that, although not shown in particular, an insulating transformer may be provided between power transmission coil unit 700 and power supply unit 600 (for example, between power transmission coil unit 700 and filter circuit 610) in power transmission device 90. Further, also in vehicle 10, an insulating transformer may be provided between power reception coil unit 100 and rectifier 200 (for example, between power reception coil unit 100 and filter circuit 150).

With the above configuration, power transmission device (contactless power transmission device) 90 can communicate with vehicle 10 and guide (power reception coil unit 100 of) vehicle 10 to power transmission coil unit 700, specifically, any of power transmission coil units 700-1 to 700-5 shown in FIG. 1. Thereby, alignment between (power reception coil unit 100 of) vehicle 10 and power transmission coil unit 700 is performed.

At the time of the alignment, weak electric power (small power) is transmitted from power transmission device 90 to vehicle 10. On this occasion, relay 202 is brought into a conductive state, and the magnitude of received voltage VR generated across resistor 201 detected by voltage sensor 203 is obtained. Since received voltage VR at the time of the alignment is lower than that at the time of full-scale power transmission, relay 210 is brought into a non-conductive state so as not be influenced by battery 300 at the time of detection. By referring to the value of received voltage VR, vehicle 10 is aligned with power transmission device 700 such that electric power is efficiently transferred from power transmission device 90 to vehicle 10.

Further, power transmission device 90 can detect a foreign substance on and around power transmission coil unit 700, using detection unit 701.

Figure 3:
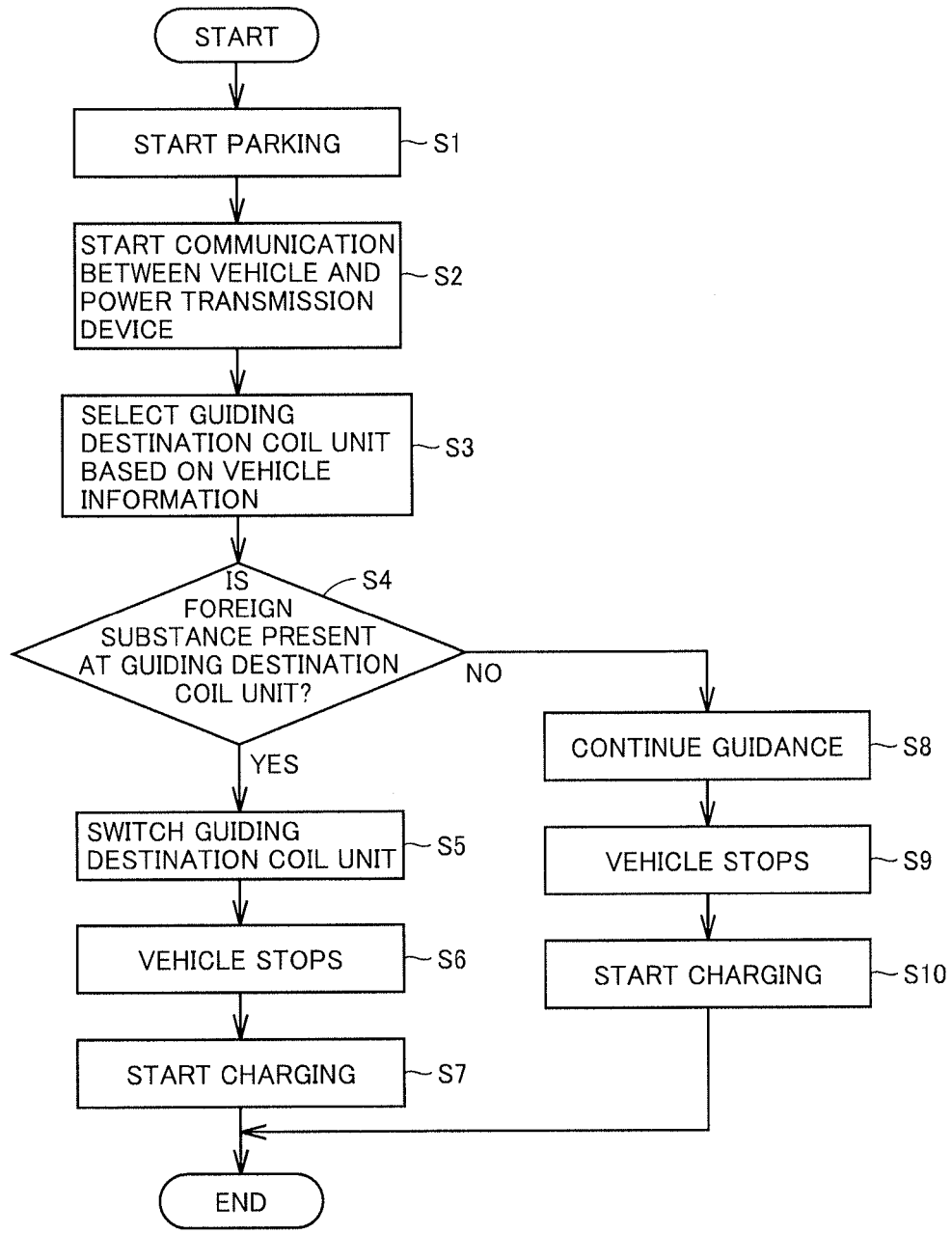
FIG. 3 is a flowchart for illustrating processing performed when a vehicle is guided to a power transmission coil unit.

FIG. 3 is a flowchart for illustrating processing performed when the vehicle is guided to the power transmission coil unit. The processing in this flowchart is performed by control unit (power supply ECU) 800 shown in FIG. 1 and the like.

Referring to FIGS. 1 and 3, first, in step S1, parking of vehicle 10 is started. For example, when no vehicle is parked at power transmission device 90 (above power transmission coil unit 700 thereof) and it is determined that vehicle 10 can be parked at power transmission device 90 and can be charged, a signal informing that power transmission device 90 is in a condition where it can charge a vehicle is sent from power transmission device 90 to the surroundings. Then, vehicle 10 receives the signal and thereby parking of vehicle 10 is started. Determination of whether or not vehicle 10 can be parked at power transmission device 90 is made, for example, based on an output of a sensor (not shown) for detecting a vehicle. As previously described, vehicle 10 may be manually parked by the driver or may be automatically parked.

In step S2, communication is started between vehicle 10 and power transmission device 90. After communication is started between vehicle 10 and power transmission device 90, information about vehicle 10 is transmitted from vehicle 10 to power transmission device 90. The information about vehicle 10 is the information about the mounting position of power reception coil unit 100 in vehicle 10.

In step S3, a power transmission coil unit to which vehicle 10 is to be guided is selected based on the vehicle information. Specifically, any of power transmission coil units 700-1 to 700-5 is selected. Thereafter, the selected power transmission coil unit is determined as a "guiding destination coil unit", and guidance of vehicle 10 to the guiding destination coil unit is started.

In step S4, it is determined whether or not a foreign substance is present at the guiding destination coil unit. When a foreign substance is present at the guiding destination coil unit (YES in step S4), the processing proceeds to step S5. On the other hand, when no foreign substance is present at the guiding destination coil unit (NO in step S4), the processing proceeds to step S8.

In step S5, the guiding destination coil unit is switched to a power transmission coil unit other than the power transmission coil unit selected in step S3 as the guiding destination coil unit. As the other power transmission coil unit, a coil unit adjacent to (i.e., located in front of or behind) the coil unit before switching is preferable. For example, in a case where power transmission coil unit 700-3 shown in FIG. 1 has been selected as the guiding destination coil unit, the guiding destination coil unit is switched to power transmission coil unit 700-2 or power transmission coil unit 700-4 located in front of or behind power transmission coil unit 700-3.

In step S6, vehicle 10 is guided to the power transmission coil unit switched in step S5 as the guiding destination coil unit, and alignment is performed. The alignment is performed, for example, with reference to received voltage VR shown in FIG. 2, as previously described. At this time, small power is transmitted to the power transmission coil unit to which vehicle 10 is guided. When the alignment is completed, vehicle 10 stops.

In step S7, charging of vehicle 10 is started, and the processing in the flowchart is terminated.

On the other hand, in step S8, guidance of vehicle 10 to the power transmission coil unit selected in step S3 as the guiding destination coil unit is continued.

In step S9, alignment of vehicle 10 with the power transmission coil selected in step S3 as the guiding destination coil unit is completed, and vehicle 10 stops.

In step S10, charging of vehicle 10 is started, and the processing in the flowchart is terminated.

According to the flowchart of FIG. 3, an appropriate power transmission coil unit is selected based on the vehicle information, that is, the information about the mounting position of the power reception coil unit in vehicle 10. Further, when a foreign substance is present at the selected power transmission coil unit, the selected power transmission coil unit is switched to another power transmission coil unit. Thereby, influence of a foreign substance at the time of charging is eliminated, and a good charging efficiency is achieved.

Finally, the embodiment of the present invention will be summarized. Referring to FIG. 1, the contactless power transmitting device (power transmission device 90) includes: a plurality of power transmission coil units 700-1 to 700-5; detection units 701-1 to 701-5 configured to detect a foreign substance on and around each power transmission coil unit; communication unit 810 configured to communicate with vehicle 10; and power supply ECU 800 configured to select one of the plurality of power transmission coil units 700-1 to 700-5 based on information about a mounting position of a power reception device (power reception coil unit 100) from vehicle 10 obtained by communication unit 810, and to guide, when a detection unit detects a foreign substance at the selected power transmission coil unit, the vehicle toward a power transmission coil unit different from the selected power transmission coil unit, before vehicle 10 stops.

According to power transmission device 90, one of the plurality of power transmission coil units 700-1 to 700-5 is selected based on the information about the mounting position of power reception device 100 in vehicle 10. Here, when a detection unit (such as detection unit 701-1) detects a foreign substance at the selected power transmission coil unit, vehicle 10 is guided toward a power transmission unit different from the selected power transmission coil. Therefore, contactless power transfer can be performed using a power transmission coil unit different from the power transmission coil at which a foreign substance is detected, in the front-rear direction of the vehicle. As a result, a reduction in contactless power transfer efficiency due to the presence of a foreign substance can be prevented.

It should be understood that the embodiment disclosed herein is illustrative and non-restrictive in every respect. The scope of the present invention is defined by the scope of the claims, rather than the above description of the embodiment, and is intended to include any modifications within the scope and meaning equivalent to the scope of the claims.

REFERENCE SIGNS LIST

1: contactless power transfer system; 90: power transmission device; 100: power reception coil unit; 120: power reception device; 150, 610: filter circuit; 200: rectifier; 201: resistor; 202, 210: relay; 203: voltage sensor; 300: battery; 400: motive power generation device; 500: vehicle ECU; 510, 810: communication unit; 520: guidance output unit; 600: power supply unit; 700: power transmission coil unit; 701: detection unit; 800: power supply ECU; 900: external power source.

The invention claimed is:

1. A contactless power transmission device, comprising:
   a plurality of power transmission coil units;
   a detection unit configured to detect a foreign substance on and around each power transmission coil unit;
   a communication unit configured to communicate with a vehicle; and
   a control unit configured to select one of the plurality of power transmission coil units based on information about a mounting position of a power reception device from the vehicle obtained by the communication unit, and to guide, when the detection unit detects a foreign substance at the selected power transmission coil unit, the vehicle toward a power transmission coil unit different from the selected power transmission coil unit, before the vehicle, which moves for positioning to the selected power transmission coil unit, stops.

2. The contactless power transmission device according to claim 1, wherein
   the plurality of power transmission coil units are arranged along a front-back direction of a parking position of the vehicle, and
   when the detection unit detects a foreign substance at the selected power transmission coil unit, the control unit guides the vehicle to a power transmission coil unit adjacent to the selected power transmission coil unit.

3. The contactless power transmission device according to claim 2, wherein the detection unit is arranged between the selected power transmission coil unit and the adjacent power transmission coil unit.

4. The contactless power transmission device according to claim 1, wherein
   the control unit transmits electric power to the power transmission coil unit toward which the vehicle is guided, and
   the vehicle performs alignment between the power transmission coil unit toward which the vehicle is guided and a power reception coil unit mounted in the vehicle, based on a received voltage of the power reception coil unit.

* * * * *